(12) United States Patent
Danner et al.

(10) Patent No.: US 12,281,261 B2
(45) Date of Patent: Apr. 22, 2025

(54) ORGANIC WASTE CARBONIZATION SYSTEM

(71) Applicant: Carbon Lock Technologies Inc., Winnipeg (CA)

(72) Inventors: Kevin Wayne Danner, Winnipeg (CA); Terrance Darrell Gray, Winnipeg (CA)

(73) Assignee: Carbon Lock Technologies Inc., Winnipeg (CA)

( * ) Notice: Subject to any disclaimer, the term of this patent is extended or adjusted under 35 U.S.C. 154(b) by 0 days.

(21) Appl. No.: 18/259,534

(22) PCT Filed: Dec. 31, 2021

(86) PCT No.: PCT/CA2021/051905
§ 371 (c)(1),
(2) Date: Jun. 27, 2023

(87) PCT Pub. No.: WO2022/140859
PCT Pub. Date: Jul. 7, 2022

(65) Prior Publication Data
US 2024/0059975 A1    Feb. 22, 2024

Related U.S. Application Data (60) Provisional application No. 63/132,596, filed on Dec. 31, 2020.

(51) Int. Cl.
*C10B 57/02* (2006.01)
*B09B 3/40* (2022.01)
(Continued)

(52) U.S. Cl.
CPC ............... *C10B 57/02* (2013.01); *B09B 3/40* (2022.01); *C10B 1/04* (2013.01); *C10B 45/00* (2013.01);
(Continued)

(58) Field of Classification Search
CPC ......... C10B 57/02; C10B 51/00; C10B 47/36; C10B 47/44
See application file for complete search history.

(56) References Cited

U.S. PATENT DOCUMENTS 4,115,202 A * 9/1978 Lorenz .................... C10B 53/08
201/37
4,134,794 A * 1/1979 Lorenz .................... C10B 53/08
201/37

(Continued)

FOREIGN PATENT DOCUMENTS

RU          2398810          9/2010

OTHER PUBLICATIONS

Li et al., "Enginnered Biochar Production and its Potential Benefits in a Closed-Loop Water-Reuse Agriculture System", Water, Oct. 13, 2020, vol. 12, p. 2847.

*Primary Examiner* — Jonathan Luke Pilcher
(74) *Attorney, Agent, or Firm* — Michael R. Williams; Ryan W. Dupuis; Ade + Company Inc (57) ABSTRACT

Described herein is a method of carbonizing organic waste to produce a stable form of biocarbon for the purposes of carbon sequestration. In some embodiments, the method is a continuous method wherein organic waste is added at a top of a carbonization system and biocarbon is recovered from a bottom thereof.

20 Claims, 3 Drawing Sheets

(51) Int. Cl.
    *C10B 1/04*   (2006.01)
    *C10B 45/00*  (2006.01)
    *C10B 49/04*  (2006.01)
    *C10B 51/00*  (2006.01)
    *C10B 53/02*  (2006.01)
    *C10B 57/14*  (2006.01)
(52) U.S. Cl.
    CPC .............. *C10B 49/04* (2013.01); *C10B 51/00* (2013.01); *C10B 53/02* (2013.01); *C10B 57/14* (2013.01)

(56) References Cited

U.S. PATENT DOCUMENTS

| | | | | |
|---|---|---|---|---|
| 4,980,029 | A * | 12/1990 | Bolz | C10B 47/18 202/217 |
| 5,584,970 | A * | 12/1996 | Schmalfeld | C10B 53/02 201/37 |
| 5,595,483 | A * | 1/1997 | Melber | B01J 19/1862 432/24 |
| 7,846,302 | B1 * | 12/2010 | Finley | C10B 7/10 202/262 |
| 8,198,493 | B1 | 6/2012 | Livingston et al. | |
| 8,470,134 | B2 * | 6/2013 | Rinker | C10L 9/08 201/37 |
| 8,808,508 | B2 * | 8/2014 | Rodriguez Hernandez | C10G 3/40 202/112 |
| 8,920,525 | B2 * | 12/2014 | Despen | C10B 47/30 44/589 |
| 8,951,390 | B2 * | 2/2015 | Ferreira de Melo | C10B 57/02 422/150 |
| 9,193,916 | B2 * | 11/2015 | Bar-Ziv | C10B 47/44 |
| 9,562,194 | B2 * | 2/2017 | Kellens | C10L 9/083 |
| 9,909,067 | B2 * | 3/2018 | Daugaard | C10C 5/00 |
| 11,060,034 | B2 * | 7/2021 | Latorre | C10B 21/18 |
| 2009/0084029 | A1 | 4/2009 | Bergman | |
| 2009/0288938 | A1 * | 11/2009 | Rodriguez Hernandez | C10G 3/40 202/84 |
| 2011/0011722 | A1 * | 1/2011 | Rinker | C10B 51/00 201/36 |
| 2011/0258914 | A1 | 10/2011 | Banasiak et al. | |
| 2011/0278149 | A1 * | 11/2011 | Hornung | C10B 57/02 201/12 |
| 2012/0085023 | A1 | 4/2012 | Teal et al. | |
| 2012/0116135 | A1 | 5/2012 | Gong et al. | |
| 2012/0285080 | A1 * | 11/2012 | Despen | C10L 5/447 252/502 |
| 2014/0053458 | A1 * | 2/2014 | Bar-Ziv | C10B 57/02 44/589 |
| 2014/0183022 | A1 * | 7/2014 | Daugaard | C10B 47/02 202/262 |
| 2015/0152347 | A1 | 6/2015 | Balon, Jr. et al. | |
| 2015/0225649 | A1 * | 8/2015 | Kellens | C10B 1/04 202/99 |
| 2020/0056098 | A1 | 2/2020 | Seidner | |
| 2020/0291300 | A1 * | 9/2020 | Latorre | C10B 21/18 |

\* cited by examiner

ORGANIC WASTE CARBONIZATION SYSTEM

PRIOR APPLICATION INFORMATION

The instant application claims the benefit of U.S. Provisional Patent Application Ser. No. 63/132,596, filed Dec. 31, 2020 and entitled "Organic Matter Carbonization System", the entire contents of which are hereby incorporated herein by reference for all purposes.

BACKGROUND OF THE INVENTION

Organic waste is an identified problem for communities worldwide. In many cases, organic waste is disposed of in a landfill where it decomposes and creates environmental problems such as air pollution, noxious odors, groundwater leachate, scavengers, and importantly methane gas, a potent greenhouse gas 86 times more powerful than carbon dioxide at trapping heat in the Earth's atmosphere over a 20-year period.

An organic waste carbonization system offers a solution. Such a system can accept and convert a broad range of organic waste into a stable form of biocarbon that may be safely and effectively sequestered in a range of places, processes or products.

The carbonization process itself may produce enough energy, either directly or indirectly, for the system to be energy self-sufficient.

SUMMARY OF THE INVENTION

According to a first aspect of the invention, there is provided a method for producing biocarbon from organic waste comprising:
  providing a quantity of organic waste having a moisture content of less than about 50%, said organic waste comprising organic waste pieces, at least about 50% of said organic waste pieces having a diameter of less than about 150 millimeters;
  conditioning the organic waste by heating the organic waste to between about 100° C. and about 200° C., said heating to between about 100° C. and about 200° C. softening the organic waste and releasing conditioning vapours therefrom, thereby producing conditioned organic waste;
  heating the conditioned organic waste to between about 200° C. and about 320° C., said heating of the conditioned organic waste to between about 200° C. and about 320° C. releasing torrefaction vapours therefrom, thereby producing torrefied organic waste;
  heating the torrefied organic waste to between about 320° C. and about 800° C., said heating of the torrefied organic waste to between about 320° C. and about 800° C. releasing pyrolysis vapours therefrom, thereby producing biocarbon; and
  recovering the biocarbon.

According to another aspect of the invention, there is provided a method for producing biocarbon from organic waste comprising:
  providing a quantity of organic waste;
  reducing moisture content of the organic waste to less than about 50%; and
  resizing the organic waste such that the organic waste comprises organic waste pieces, at least about 50% of said organic waste pieces having a diameter of less than about 150 millimeters, thereby producing prepared organic waste;
  conditioning the prepared organic waste by heating the organic waste to between about 100° C. and about 200° C., said heating of the prepared organic waste to between about 100° C. and about 200° C. softening the prepared organic waste and releasing conditioning vapours therefrom, thereby producing conditioned organic waste;
  heating the conditioned organic waste to between about 200° C. and about 320° C., said heating of the conditioned organic waste to between about 200° C. and about 320° C. releasing torrefaction vapours therefrom, thereby producing torrefied organic waste;
  heating the torrefied organic waste to between about 320° C. and about 800° C., said heating of the torrefied organic waste releasing pyrolysis vapours therefrom, thereby producing biocarbon; and
  recovering the biocarbon.

According to another aspect of the invention, there is provided a method for producing biocarbon from organic waste comprising:
  providing a quantity of organic waste having a moisture content of less than about 50%, said organic waste comprising organic waste pieces, at least about 50% of said organic waste pieces having a diameter of less than about 150 millimeters;
  conditioning the organic waste by heating the organic waste to between about 100° C. and about 200° C. in a first zone of a carbonization system, said heating of the organic waste to between about 100° C. and about 200° C. softening the organic waste and releasing conditioning vapours therefrom, thereby producing conditioned organic waste;
  removing said conditioning vapours from the first zone of the carbonization system;
  heating the conditioned organic waste to between about 200° C. and about 320° C. in a second zone of a carbonization system, said heating of the conditioned organic waste to between about 200° C. and about 320° C. releasing torrefaction vapours therefrom, thereby producing torrefied organic waste;
  removing said torrefaction vapours released from the second zone of the carbonization system;
  heating the torrefied organic waste to between about 320° C. and about 800° C. in a third zone of the carbonization system, said heating of the torrefied organic waste to between about 320° C. and about 800° C. releasing pyrolysis vapours therefrom, thereby producing biocarbon;
  removing said pyrolysis vapours from the third zone of the carbonization system; and
  recovering the biocarbon from the carbonization system.

According to another aspect of the invention, there is provided a continuous method for producing biocarbon from organic waste comprising:
  adding a quantity of organic waste having a moisture content of less than about 50%, said organic waste comprising organic waste pieces, at least about 50% of said organic waste pieces having a diameter of less than about 150 millimeters to a first zone of a carbonization system at a top of a carbonization system;
  conditioning the organic waste by heating the organic waste to between about 100° C. and about 200° C. in the first zone of the carbonization system, said heating of the organic waste to between about 100° C. and about 200° C. softening the organic waste and releasing conditioning vapours therefrom, thereby producing conditioned organic waste;

removing said conditioning vapours from the first zone of the carbonization system;

said conditioned organic waste passing from the first zone of the carbonization system to a second zone of the carbonization system;

heating the conditioned organic waste to between about 200° C. and about 320° C. in the second zone of the carbonization system, said heating of the conditioned organic waste to between about 200° C. and about 320° C. releasing torrefaction vapours therefrom, thereby producing torrefied organic waste;

removing said torrefaction vapours from the second zone of the carbonization system;

said torrefied organic waste passing from the second zone of the carbonization system to a third zone of the carbonization system;

heating the torrefied organic waste to between about 320° C. and about 800° C. in the third zone of the carbonization system, said heating of the organic waste to between about 320° C. and about 800° C. releasing pyrolysis vapours therefrom, thereby producing biocarbon;

removing said pyrolysis vapours from the third zone of the carbonization system; and recovering the biocarbon from the carbonization system.

According to another aspect of the invention, there is provided an apparatus for a carbonization system, said apparatus comprising:

a heating zone and/or chamber for receiving organic waste a funnel at a top portion of the heating zone and/or chamber, said funnel configured to direct the organic waste into the heating zone and/or chamber;

a vapour extraction pipe or duct positioned above the bottom level of the funnel for removing vapour from the organic waste;

a heat sleeve on an outer surface of the heating zone and/or chamber, said heat sleeve configured to heat the organic waste in the heating zone and/or chamber to a temperature between about 100° C. and about 800° C.;

a circulation heater connected at a first end to the vapour extraction pipe or duct and receiving drawn off vapour from the vapour extraction pipe or duct, said circulation heater connected at a second end thereof to an injector, said injector positioned at a bottom of the heating zone and/or chamber, said injector configured to inject heated vapour into the organic waste.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Described herein is a method for the carbonization of organic waste to produce biocarbon. In some embodiments, vapours produced during the carbonization process and/or within the carbonization system are recovered and may be used for other purposes, as discussed herein. In some embodiments, the method is a continuous method wherein organic waste is added at a top of a carbonization system and biocarbon is recovered from a bottom thereof.

Definitions

About—As used herein, "about" refers to a value that is within plus or minus 10% of the base value. For example, "about 100" refers to a range of 90-110 inclusive.

Airlock—A mechanical system that facilitates the passage of solids while minimizing the passage of vapours.

Anaerobic Digestion—A process wherein microorganisms break down organic waste within a liquid, oxygen-free environment for the purposes of producing fuels.

Atmospheric Carbon—Carbon that exists in the Earth's atmosphere in the form of gaseous compounds such as carbon dioxide and methane.

Biocarbon—A stable form of carbon produced from organic waste through carbonization.

Carbonization—A process of converting organic waste into a biocarbon through destructive distillation or pyrolysis.

Composting—A process of decomposing organic waste via microbial action to produce a nutrient-rich soil additive.

Destructive Distillation—The chemical process of decomposing organic substances by "cracking" or breaking the bonds within their molecules through the application of high heat.

Global Warming—An increase in the earth's atmospheric and oceanic temperatures caused by an increase in greenhouse gases.

Granulate—The action of forming granules or grains from organic material by either rendering larger pieces into smaller granules or grains, or aggregating smaller pieces into larger granules or grains.

Greenhouse Gas—Any of various gaseous compounds that absorb infrared radiation, trap heat in the atmosphere and contribute to global warming.

Incineration—A waste treatment method that involves combusting organic and non-organic waste.

Landfill—A waste treatment method that involves burying organic and non-organic waste in the ground.

Organic waste—A broad range of carbon-based materials found within natural and engineered, terrestrial and aquatic environments that are composed of organic compounds that have come from organisms such as plants and animals and their products in the environment. As a form of waste it may include but not be limited to landscape, garden, and household organic material (e.g. branches, leaves, grass, food waste, pet waste), forestry and agricultural organic material (e.g. branches, leaves, roots, bark, stems, stalks, stover, husks, chaff, seeds, shells, manure, etc.), wood and wood products (e.g. sawdust, waste wood, waste lumber, construction waste) and industrial, commercial and institutional organic material (e.g. food and agri-food waste), sewage, sludge and biosolids, animal by-products, and other forms of organic material.

Oxygen-limited—An environment in which the concentration of oxygen present is limited to a point below which combustion is not possible for a given temperature and pressure.

Pyrolysis—The thermal decomposition of matter at elevated temperatures in an oxygen-limited atmosphere.

Figure 2:
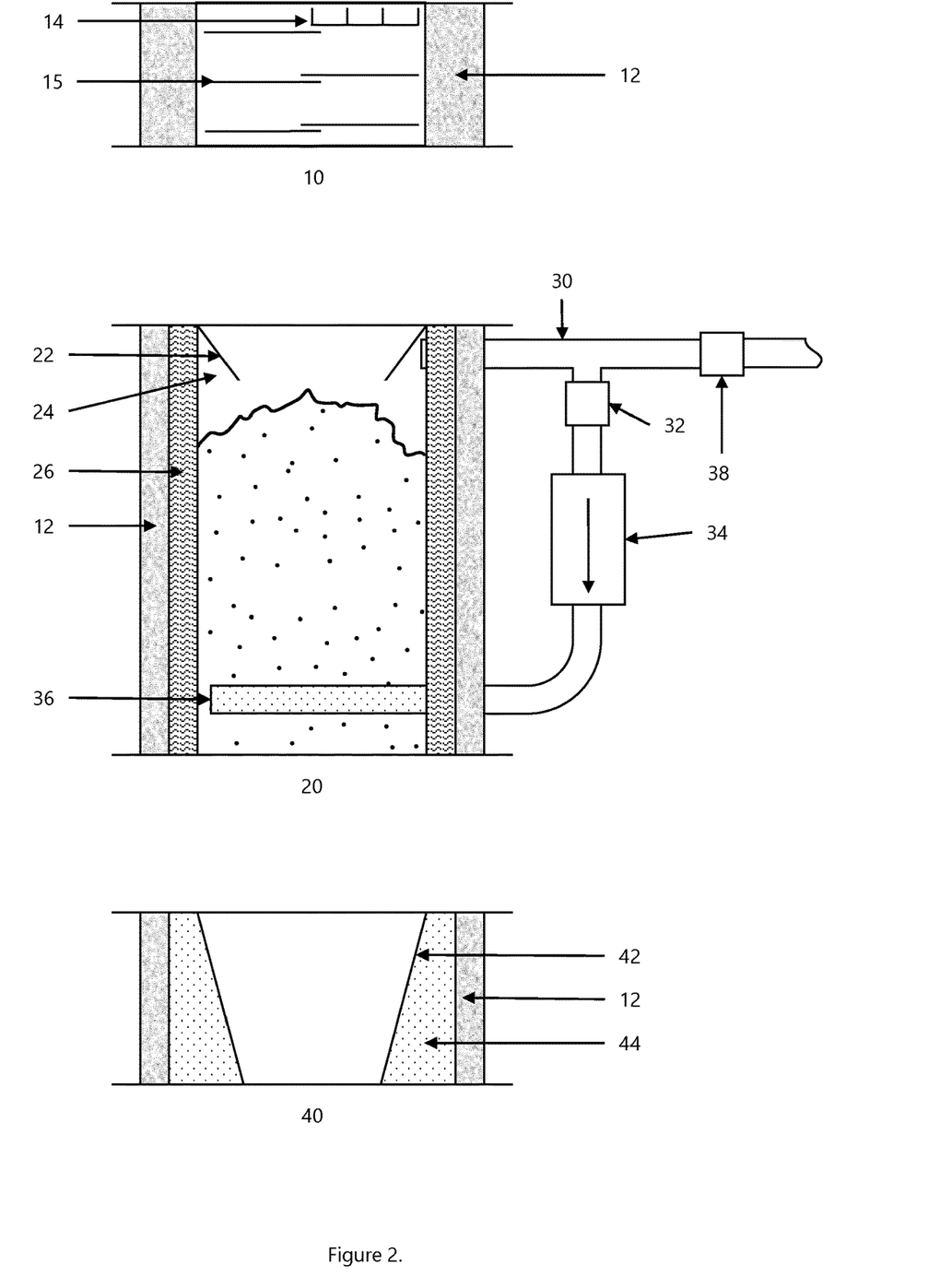
FIG. 2. Schematic diagram of one embodiment each of an airlock assembly, a heating chamber and a collection hopper.

Vapours—The range of condensable and non-condensable gases produced via the carbonization of organic waste. Such vapours may in some publications be called syngas, bio-gas, wood gas, pyrolysis gas, pyrolysis oil, bio-oil, tar, and the like. The type of vapours produced at the various temperatures within the carbonization process are differentiated. Conditioning vapours or early-stage vapours may be produced at temperatures between about 100° C. and about 200° C. and may include primarily water vapour, carbon dioxide, carbon monoxide and smaller amounts of organic compounds, as shown in FIG. 2. Torrefaction vapours or mid-stage vapours may be produced at temperatures between about 200° C. and about 320° C. and may include higher amounts of carbon dioxide, carbon monoxide, pyroligneous acids, and other oxygenated volatile organic compounds and tars, as shown in FIG. 2. Pyrolysis vapours or later-stage vapours may be produced at temperatures between about 320° C. and about 800° C., for example, between about 320° C. and 600° C. and may include higher amounts of hydrogen, methane and other hydrocarbons and non-condensable volatile and/or combustible gases, as shown in FIG. 2.

The components of the method for the carbonization of organic waste according to the method of invention can be described generally as follows.

Organic Waste

As discussed herein, any suitable organic waste may be used within the invention for the production of the biocarbon.

In some embodiments of the invention, the organic waste used in the process is prepared prior to use. That is, the preparation of the organic waste for use in the process is not necessarily the initial step of the process and suitably prepared organic waste may be provided for use in the process to produce biocarbon as described herein.

As will be appreciated by one of skill in the art, "organic waste" can be classified as anything that was once "alive". Exemplary examples include but are by no means limited to trees, branches, leaves, roots, wood chips, lumber, saw dust, agricultural and crop waste, industrial, commercial and residential food waste, municipal sewage sludge and biosolids, manure, and the like. As discussed below, organic waste may be prepared prior to use in the carbonization system through various processes to target a range of size and/or moisture levels.

As discussed below, organic waste of a "large" or "woody" or "stalky" type may be reduced in size with machinery such as for example a wood-chipper or shredding machinery having similar and/or equivalent functionality for the reduction of size of said organic waste.

As discussed below, in some embodiments, organic waste of a "fine", "light" or "low density" type may be caused to form into higher-density aggregates or granules through for example a granulator, pelletizer, or machinery having similar and/or equivalent functionality for the densification of said organic waste.

As discussed below, organic waste of a "soft" or "moist" or "wet" type may be processed using compressive force, centrifugal separation, agitation, steam drying, heated air drying, or machinery having similar and/or equivalent functionality for the reduction of moisture of said organic waste.

In some embodiments, the organic waste is separated and processed differently. As will be appreciated by one of skill in the art, for example, yard and garden waste may be separated from for example food waste as at least these types of organic waste would require different material sizing and moisture reduction processes. For example, yard and garden waste may be subjected to for example a wood-chipper for size reduction and, depending on the age thereof, may require less moisture reduction. However, food waste may be reduced in size by a food grinder and may require more drying.

As will be appreciated by one of skill in the art, it is preferable that metals, ceramics, and other matter that could damage the material sizing machinery, moisture reduction machinery and the carbonization system itself be identified and separated out. That is, while not essential, removal of this type of material from the organic waste will result in less maintenance being needed on the machinery required for preparation of the organic waste.

Material Sizing

As discussed above, depending on the type, organic waste may be for example, ground, shredded, sliced, crushed, squeezed and/or granulated to reduce the size of the organic waste, that is, to produce pieces of organic waste to between about 1 mm to about 150 mm in diameter, for example, between about 1 mm to about 140 mm, between about 1 mm to about 130 mm, between about 1 mm to about 120 mm, between about 1 mm to about 110 mm, between about 1 mm to about 100 mm, between about 1 mm to about 90 mm, between about 1 mm to about 80 mm, between about 1 mm to about 70 mm, between about 1 mm to about 60 mm, or between about 1 mm to about 50 mm, preferably about 5 mm to about 10 mm in average diameter. In other cases, organic waste, for example, fine, light or low-density organic waste, may be for example aggregated, agglomerated, pelletized or granulated to increase the size of the organic waste particles to between about 1 mm and about 150 mm in diameter, for example about 1 mm to about 50 mm, preferably about 5 mm to about 10 mm in average diameter. That is, in some embodiments, the organic waste is processed such that at least about 50%, at least about 60%, at least about 70%, at least about 80%, at least about 90%, at least about 95%, substantially all or 100% of the organic waste pieces have a diameter of less than about 150 mm, for example, a diameter of less than about 50 mm. This is done to increase surface area relative to volume of the pieces of organic waste and reduce the energy requirements for the moisture reduction and carbonization processes, as discussed herein. As will be apparent to one of skill in the art, pieces of organic waste with a diameter of 150 mm or larger will get converted to biocarbon by the process, but this conversion would take longer and require greater amounts of energy than for pieces of organic waste with diameters as recited above. Conversely, chipping and grinding organic waste into pieces of a diameter of less than about 5 mm may require inputs of energy which may exceed that of the energy gained by carbonization of the organic waste according to the process and/or system of the invention.

Moisture Reduction

Depending on the type, organic waste may be dried to a moisture level between 0% to about 50%, for example, 0 to about 45%, 0 to about 40%, 0 to about 35%, 0 to about 30%, 0 to about 25% or 0 to about 20%. As will be appreciated by one of skill in the art, any suitable method known in the art, for example, compressive force, centrifugal separation, agitation, steam drying, heated air drying, or the like may be used to reduce moisture levels of the organic waste. It may be that the heat generated from the carbonization process is transferred to the moisture reduction process, as discussed below.

In some embodiments of the invention, the incoming organic waste that has been sized as discussed above has a moisture content of less than 50%, for example, less than 45%, less than 40%, less than 35%, less than 30%, less than 25%, less than 20%, less than 15%, less than 10% or less than 5%. As will be appreciated by one of skill in the art, this refers to the moisture content of the total quantity of the organic waste entering the system and/or being acted on by the process over a given time period and not necessarily at a specific moment in time.

Water Vapour

A biproduct of the moisture reduction process may be water vapour. This vapour may be allowed to vent to the ambient without further processing or may be filtered through the use of Biocarbon Filters.

Liquid

A biproduct of the moisture reduction process may be liquid extracted from the organic waste. This liquid may primarily be water and may contain organisms, chemicals, and other contaminants. It may be allowed to enter the local municipal water treatment system or it may be filtered through the use of Biocarbon Filters.

Biocarbon Filters

Biocarbon filters are vessels filled with biocarbon for example biocarbon produced by the carbonization process describe below. When liquids or vapours are passed through the biocarbon filters impurities are removed. The filtered air may be allowed to vent to ambient and the filtered liquid may be composed primarily of clean water or sufficiently clean water and may be released safely into the environment or local water treatment systems. Periodic testing of this air and water may be conducted to ensure compliance with local regulations.

Prepared Organic Waste

The primary solid outputs of the Material Sizing and Moisture Reduction processes may be a prepared organic waste, composed of mostly pieces of organic waste prepared as described herein. These pieces of organic waste may be fed into the carbonization system, as described herein.

Carbonization Process

Figure 1:
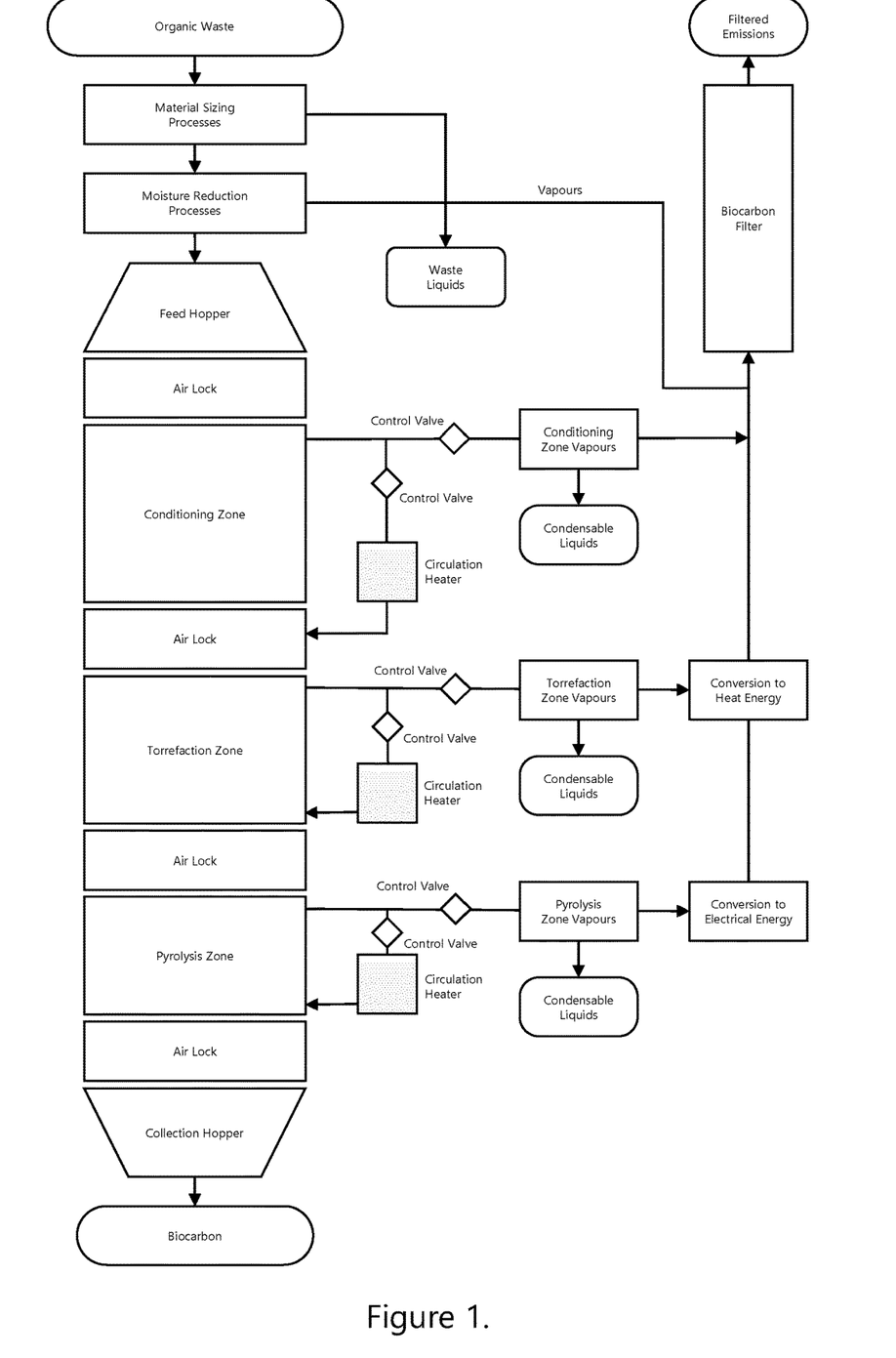
FIG. 1. Process diagram of one embodiment of the process of the invention.

A flow chart diagram of one embodiment of the carbonization process is shown in FIG. 1. In some embodiments, the prepared organic waste may be fed into the carbonization system through mechanical means. The carbonization system may comprise one or more, for example, two or more, three or more or four or more heating zones within the carbonization system. In those embodiments wherein there are two or more heating zones, each heating zone within the carbonization system may be separate from the adjacent heating zone with an airlock or similar mechanism such that a low-oxygen environment within the entire carbonization system is maintained, as discussed herein.

In some embodiments, each heating zone within the carbonization system has associated therewith a heating system for controlling the temperature of the zone; one or more temperature sensors to which the heating element is either directly or indirectly responsive; a pressure sensor for detecting the release of vapours from the organic waste during the carbonization process within the specific zone; a level sensor for detecting the amount of material within each zone; and a vapour extraction pipe or duct and control valve for allowing and controlling the drawing off said vapours.

As will be appreciated by one of skill in the art, each respective heating system associated with a specific heating zone may comprise any suitable heating element, preferably a heating element that either alone or in combination allows for fine control and/or regulation of the temperature of the respective heating zone, as discussed herein. For example, a heating system as described herein may include one or more electric heating elements but may also include other heating means, such as for example hot air ducts, hot flue gas sleeves, recirculated and reheated vapours from within the heating zone, or heating fluid sleeves or pipes which may be used to provide a minimum temperature within the system so that the electrical heating elements or other suitable means can be used to provide finer control of the reaction temperatures, as discussed herein.

In those embodiments wherein the carbonization system comprises two or more heating zones, each heating zone may comprise a mechanical agitator to promote movement of the organic waste through the carbonization system, for example, from a top of the respective heating zone to a bottom of the respective heating zone. Furthermore, each heating zone may be separated by and/or connected by for example an airlock, such as a mechanical airlock, as discussed herein. As will be appreciated by one of skill in the art, once the organic waste reaches the bottom of a respective heating zone, the organic waste is passed through the airlock to the next heating zone in sequence, as discussed herein or is passed out of the carbonization system if the organic waste has been converted to biocarbon. As will be appreciated by one of skill in the art, an airlock affixed to the bottom of a first heating zone is also affixed to the top of the next heating zone in sequence.

The carbonization may occur in a low-oxygen environment within the heating zones. In some embodiments, the heating zones are separated for example with mechanical airlocks so that the low-oxygen environment is maintained, thereby encouraging destructive distillation and pyrolytic processes to occur without the risk of combustion. The residence time of the organic waste and the temperature of the carbonization processes within the respective heating zones may be variable, based on operator preferences, that is, based on desired outcomes. For example, as discussed herein, longer residence times, that is, slower processing, may increase biocarbon yield whereas shorter residence times may favour vapour production.

As described herein, the carbonization process occurs in stages and as discussed herein, each stage or substantially all of each stage may take place in a specific heating zone and/or chamber. For example, pyrolysis may take place in more than one stage if it is desirable to recover a specific vapour or mixture of vapours from the organic waste.

In some embodiments, the carbonization system may be arranged so that the heating zone and/or chambers are "stacked" vertically to allow gravity to assist in moving the organic waste from higher (earlier) to lower (later) heating zones and/or chambers, as discussed herein. Furthermore, two or more carbonization systems may be arranged in series such that organic waste from a common source can be distributed to the two or more carbonization systems.

In some embodiments, the carbonization system may include a plurality of physically distinct heating zone and/or chambers wherein each heating zone and/or chamber is arranged or configured to subject the organic waste to specific conditions, for example, a specific temperature range, for example, for production, removal and/or recovery of a specific vapour or mixture of vapours, as discussed herein.

As will be appreciated by one of skill in the art, when the heating zone and/or chambers are arranged substantially vertically, for example, vertically, the size or volume of these different heating zones and/or chambers within the carbonization system may be variable. Specifically, the size or volume of these heating zones and/or chambers may be varied according to the desired time of residency of the organic waste within the specific heating zone and/or chamber and the associated loss of mass via vapour production and removal within each heating zone and/or chamber. For example, the carbonization system may be arranged such that the ratio of the size or volumes of the conditioning zone to the torrefaction zone to the pyrolysis zone is about 10:about 7:about 4. It is important to note that this ratio is intended for illustrative purposes and that in some embodiments, depending on the outcome desired by the user, different ratios may be used. It is also important to note that the mass of the organic waste is reduced as the organic waste is processed in the carbonization system. For example, the mass of the organic waste may be reduced by up to 80% as the organic waste is converted to biocarbon by the process and/or system of the invention.

Figure 3:
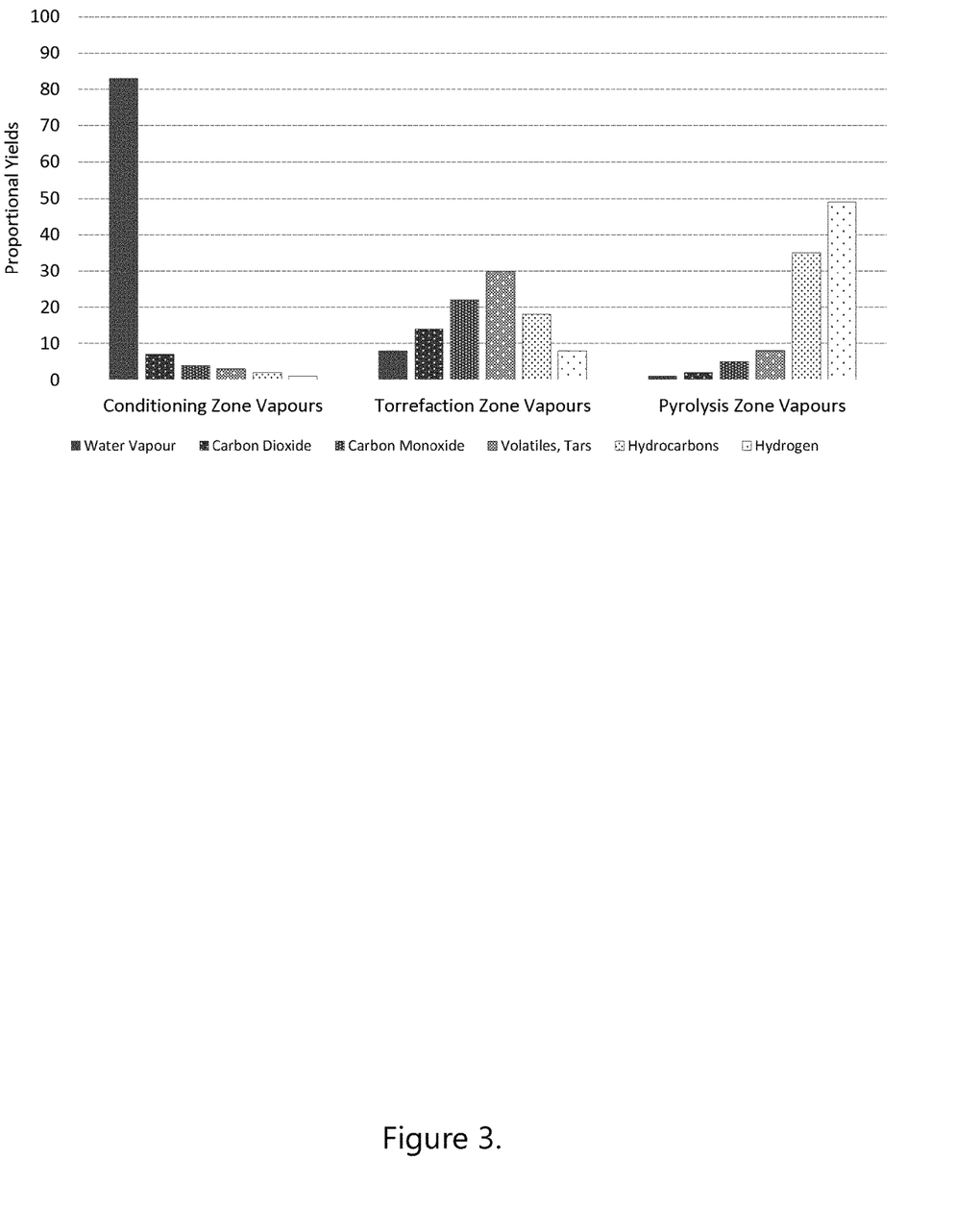
FIG. 3. Bar graph showing outputs produced by the carbonization process.

As discussed herein, vapours are released from the organic waste during heating. Different vapours begin to release at different temperatures and release at different rates at different temperatures. The primary vapours produced include but are not limited to in no particular order water vapour, oxygen, carbon monoxide, carbon dioxide, volatile organic compounds, methane, hydrocarbons and hydrogen. Each of these vapours is released from the organic waste at specific temperature ranges, one example of which is shown in FIG. 3. These vapours are released due to the decomposition of the molecules and/or cells in the organic waste such as lignin, cellulose and hemicellulose. For example, the order in which the vapours are produced as the feedstock is heated may be first water vapour, carbon monoxide and carbon dioxide, second is methane then hydrocarbons and last is hydrogen. As will be appreciated by one of skill in the art, the order and volumes of gases produced within a specific heating zone and/or chamber will vary depending on feedstock type and properties, and by alterations in operating parameters such as temperature and residence times.

The stages of carbonization may include at least the following:

1. Conditioning—incoming organic waste entering the system of the invention or being acted on by the method of the invention may be heated to between about 100° C. and about 200° C., for example, from 100° C. to 200° C. as material passes from a top of a heating zone and/or chamber to a bottom of a heating zone and/or chamber, to thermally soften matter, drive off unbound and chemically-bound water, and produce early-stage or conditioning vapours, as can be seen in FIG. 3. Specifically, as can be seen in FIG. 3, typically, most of the vapour produced during the conditioning stage is water vapour.

2. Torrefaction—conditioned organic waste may be heated to between about 200° C. and about 320° C., that is, from 200° C. to 320° C. as the matter moves from a top of a heating zone and/or chamber to a bottom of a heating zone and/or chamber, as discussed herein, to begin to release mid-stage or torrefaction vapours, as shown in FIG. 3. Specifically, as can be seen, typically, vapours comprising volatiles, tars, carbon dioxide, carbon monoxide and some hydrogen and hydrocarbons are produced during the torrefaction stage, as shown in FIG. 3.

3. Carbonization—torrefied organic matter may be heated to between about 320° C. and about 800° C., for example between about 320° C. to about 600° C., for example from 320° C. to 600° C. as the matter moves from a top of a heating zone and/or chamber to a bottom of a heating zone and/or chamber, and will release later-stage or pyrolysis vapours, as shown in FIG. 3, and will yield solid biochar as final output. Specifically, typical vapours produced during the pyrolysis stage comprise hydrogen and hydrocarbons with some volatiles and tars, as shown in FIG. 3.

As discussed herein, each of these stages may take place in a separate, dedicated zone and/or chamber. The parts of one embodiment of such a zone and/or chamber are shown schematically in FIG. 2 and are discussed in greater detail below. Alternatively, each stage may take place in more than one zone and/or chamber, for example, for heating the organic waste to different temperature ranges. Specifically, heating the organic waste to above 100° C. results in the production of water vapour, which may be removed and may be collected. In some embodiments, the organic waste is heated to above 100° C. until no further water vapour is detected and/or collected.

As discussed herein, the recovered vapours could potentially be used for pre-preparation drying either directly or indirectly of the incoming organic waste. Similarly, recovered vapours could be pumped into other stages to act as a heat transfer medium and to produce a positive pressure in the respective stage.

For example, in some embodiments, one or more circulation heaters is used to draw out a portion of the vapours or gases for example, from a headspace at a top of the respective heating zone and/or chamber. The drawn off vapours or gases are then run through a circulation heater, and then pumped back into the bottom of the cylinder through a diffusing element, for example, a perforated pipe, ring, plate or similar structure. As will be appreciated by one of skill in the art, as a result of this arrangement, a pressure differential will be created so that the newly heated vapours will "percolate" up through the feedstock mass, transferring heat to the material via convection. This can be run continuously. In these embodiments, vapours are removed by a duct or pipe fitted with a control valve so that when the pressure rises in the heating zone and/or chamber to a threshold value, some of the vapours are released or drawn off to gas handling stages, for example, condensation, combustion, collection or the like.

Alternatively, or in addition, vapours produced in this stage may be recovered and condensed to yield marketable liquids. Similarly, recovered vapours may be combusted for the production of heat and/or combusted and converted into mechanical or electrical energy, as discussed herein. As discussed herein, this heat, motion and/or electricity may be used within the carbonization system. Alternatively, the vapours may be recovered and/or stored and used for other purposes.

Cooling

The biocarbon that leaves the final heating zone and/or chamber may be allowed to cool, through the use of an air or liquid circulation sleeve. Heat removed from this sleeve may be used to improve the efficiency of earlier processes, such as the conditioning processes or Moisture Reduction process.

Heat Energy

The stages of the carbonization processes may produce heat energy, which may be captured and used throughout for other elements or processes of the system.

Condensable Vapours

A biproduct of the carbonization process may be vapours that can be condensed into liquids, such as water, wood vinegar, bio-oils and the like. Some such liquids may be combusted in a burner to produce heat. Alternatively, some such liquids may be recovered, stored, properly disposed of and/or sold.

Non-Condensable Vapours

A biproduct of the carbonization process may be vapours that can be combusted to produce mechanical, heat or electrical energy, for use in other processes, or recovered, stored and sold.

Electricity

Electricity produced by the processes described herein may be used to provide electrical power to the organic waste carbonization system or certain elements or processes thereof. Alternatively, excess electricity may be sold to the local power utility or used to produce hydrogen.

Combustion Emissions

A biproduct of processing certain vapours into energy may be combustion emissions, which may include compounds such as nitrogen oxides, sulfur species, carbon dioxide, volatile organic compounds, trace elements, and particulate matter.

Biocarbon Filter

A biocarbon filter may be used to remove compounds from combustion emissions. The filtered combustion emissions may be released into the atmosphere.

Biocarbon

The carbonization process produces biocarbon, primarily comprised of carbon, as well as minerals and other trace elements. Biocarbon may be used to filter liquids or combustion emissions. Biocarbon may be sequestered in a range of places, processes or products or sold to commercial or industrial users.

PLC (Programmable Logic Controller)

The entire carbonization process may be controlled by a control unit, for example, a PLC (Programmable Logic Controller). It may include sensors, probes, actuators, valves, electrical motors, and other sensing or controlling systems.

For example, the sensors may monitor the temperature of the zones or chambers of the carbonization system. As will be appreciated by one of skill in the art, there may be multiple sensors within a given zone and/or chamber of the carbonization system for monitoring and/or tracking temperatures within specific regions of the carbonization system. Sensors may also detect vapours as they are released or once they are no longer being released from the organic waste within a specific heating zone and/or chamber of the carbonization system. As discussed herein, vapours produced within the carbonization system may be drawn off as they are produced. For example, as discussed herein, a specific vapour or mixture of vapours may be drawn off from a specific zone and/or chamber of the carbonization system that is being heated to a specific desirable temperature as shown in FIG. 2.

According to an aspect of the invention, there is provided a method for producing biocarbon from organic waste comprising:

providing a quantity of organic waste having a moisture content of less than about 50%, said organic waste comprising organic waste pieces, at least 50% of said organic waste pieces having a diameter of less than about 150 millimeters;

conditioning the organic waste by heating the organic waste to between about 100° C. and about 200° C., said heating the organic waste to about 100° C. and about 200° C. softening the organic waste and releasing conditioning vapours therefrom, thereby producing conditioned organic waste;

heating the conditioned organic waste to between about 200° C. and about 320° C., said heating of the organic waste to between about 200° C. and about 320° C. releasing torrefaction vapours therefrom, thereby producing torrefied organic waste;

heating the torrefied organic waste to between 320° C. and 800° C., said heating of the torrefied organic waste to between 320° C. and 800° C. releasing pyrolysis vapours therefrom, thereby producing biocarbon; and recovering the biocarbon.

In some embodiments, at least about 60%, at least about 70%, at least about 80%, at least about 90%, at least about 95%, substantially all or 100% of the organic waste pieces have a diameter of less than 150 millimeters, for example, between about 1 mm to about 140 mm, between about 1 mm to about 130 mm, between about 1 mm to about 120 mm, between about 1 mm to about 110 mm, between about 1 mm to about 100 mm, between about 1 mm to about 90 mm, between about 1 mm to about 80 mm, between about 1 mm to about 70 mm, between about 1 mm to about 60 mm, between about 1 mm to about 50 mm.

As discussed herein, in some embodiments, "fine", "light" or "low density" types of organic waste may be removed during pre-processing of the organic waste and may be pelletized or otherwise converted to larger diameter material. In these embodiments, the diameter may be between about 5 mm to about 150 millimeters, for example, between about 5 mm to about 140 mm, between about 5 mm to about 130 mm, between about 5 mm to about 120 mm, between about 5 mm to about 110 mm, between about 5 mm to about 100 mm, between about 5 mm to about 90 mm, between about 5 mm to about 80 mm, between about 5 mm to about 70 mm, between about 5 mm to about 60 mm, between about 5 mm to about 50 mm.

In some embodiments, the organic waste is dried to a moisture level between 0% to about 50%, for example, 0% to about 45%, 0% to about 40%, 0% to about 35%, 0% to about 30%, 0% to about 25% or 0% to about 20%.

In some embodiments, the organic waste is conditioned by heating the organic waste to about 200° C. as the material passes from a top of the conditioning heating zone and/or chamber to a bottom of the conditioning heating zone and/or chamber.

In some embodiments of the invention, the conditioning vapours comprise water vapour, for example, carbon dioxide and water vapour.

In some embodiments, the conditioned organic waste is heated from about 200° C. to about 320° C. as material passes from a top of the torrefaction heating zone and/or chamber to a bottom of the torrefaction heating zone and/or chamber.

In some embodiments of the invention, the torrefaction vapours comprise carbon dioxide and carbon monoxide, for example, carbon monoxide, carbon dioxide, volatiles, tars and various forms of condensable and non-condensable organic compounds.

In some embodiments, the torrefied organic waste is heated from about 320° C. to about 800° C., or from about 320° C. to about 600° C. as material passes from a top of the pyrolysis heating zone and/or chamber to a bottom of the pyrolysis heating zone and/or chamber.

In some embodiments, the pyrolysis vapours comprise hydrogen and hydrocarbons, for example, hydrogen, hydrocarbons, volatiles and tars.

According to an aspect of the invention, there is provided a method for producing biocarbon from organic waste comprising:

providing a quantity of organic waste;
reducing moisture content of the organic waste to less than about 50%;
resizing the organic waste such that the organic waste comprises organic waste pieces, at least about 50% of said organic waste pieces having a diameter of less than about 150 millimeters, thereby providing prepared organic waste;
conditioning the prepared organic waste by heating the prepared organic waste to between about 100° C. and about 200° C., said heating of the prepared organic waste to between 100° C. and 200° C. softening the prepared organic waste and releasing conditioning vapours therefrom, thereby producing conditioned organic waste;
heating the conditioned organic waste to between about 200° C. and about 320° C., said heating of the conditioned organic waste to between about 200° C. and about 320° C. releasing torrefaction vapours therefrom, thereby producing torrefied organic waste;
heating the torrefied organic waste to between about 320° C. and about 800° C., said heating of the torrefied organic waste to between about 320° C. and about 800° C. releasing pyrolysis vapours therefrom, thereby producing biocarbon; and
recovering the biocarbon.

According to another aspect of the invention, there is provided a method for producing biocarbon from organic waste comprising:
providing a quantity of organic waste having a moisture content of less than about 50%, said organic waste comprising organic waste pieces, at least about 50% of said organic waste pieces having a diameter of less than about 150 millimeters;
conditioning the organic waste by heating the organic waste to between about 100° C. and about 200° C. in a first zone and/or chamber of a carbonization system, said heating of the organic waste to between about 100° C. and about 200° C. softening the organic waste and releasing conditioning vapours therefrom, thereby producing conditioned organic waste;
removing said conditioning vapours released from the conditioned organic waste from the first zone and/or chamber of the carbonization system;
heating the conditioned organic waste to between about 200° C. and about 320° C. in a second zone and/or chamber of a carbonization system, said heating of the conditioned organic waste to between about 200° C. and about 320° C. releasing torrefaction vapours therefrom, thereby producing torrefied organic waste;
removing said torrefaction vapours released from the torrefied organic waste from the second zone and/or chamber of the carbonization system;
heating the torrefied organic waste to between about 320° C. and about 800° C. in a third zone and/or chamber of the carbonization system, said heating of the torrefied organic waste to between about 320° C. and about 800° C. releasing pyrolysis vapours therefrom, thereby producing biocarbon;
removing said pyrolysis vapours from the pyrolyzed organic waste from the third zone and/or chamber of the carbonization system; and
recovering the biocarbon from the carbonization system.

In some embodiments, the carbonization system is arranged substantially vertically or vertically such that organic waste is added to the carbonization system at a top thereof and biocarbon exits the carbonization system at a bottom thereof.

In some embodiments, the biocarbon is cooled directly or indirectly with circulating air or water through a cooling sleeve before or as the biocarbon exits the process or the carbonization system.

In some embodiments, the biocarbon is collected and cooled in a collection hopper, one embodiment of which is shown in FIG. 2. Specifically, in this embodiment, biocarbon exiting the last heating zone and/or chamber is collected in a collection hopper 40 which comprises a cone section 42 that is surrounded by a cooling sleeve 44 that may be air-cooled or liquid-cooled, as discussed herein or using means known in the art.

In some embodiments of the invention, each treatment zone is a separate and distinct heating zone and/or chamber.

According to another aspect of the invention, there is provided an apparatus for a carbonization system, said apparatus comprising:
a heating zone and/or chamber for receiving organic waste
a funnel at a top portion of the heating zone and/or chamber, said funnel configured to direct the organic waste into the heating zone and/or chamber;
a vapour extraction pipe or duct positioned above the bottom level of the funnel for removing vapour from the organic waste;
a heat sleeve on an outer surface of the heating zone and/or chamber, said heat sleeve configured to heat the organic waste in the heating zone and/or chamber to a temperature between about 100° C. and about 800° C.;
a circulation heater connected at a first end to the vapour extraction pipe or duct and receiving drawn off vapour from the vapour extraction pipe or duct, said circulation heater connected at a second end thereof to an injector, said injector positioned at a bottom of the heating zone and/or chamber, said injector configured to inject heated vapour into the organic waste.

In some embodiments, each heating chamber and/or heating zone within the carbonization system has associated therewith a heating system for controlling the temperature of the zone; one or more temperature sensors to which the heating element is either directly or indirectly responsive; a pressure sensor for detecting the release of vapours from the organic waste during the carbonization process within the specific zone; a level sensor for detecting the amount of material within each zone; and a vapour extraction pipe or duct pipe and control valve for allowing and controlling the drawing off said vapours.

One embodiment of a heating zone and/or chamber is shown in FIG. 2. As can be seen therein, organic matter 10 enters the heating zone and/or chamber 20 via a funnel 22. The positioning of this funnel 22 at the top of the heating zone and/or chamber 22 creates a vapour collection space 24, as discussed below, from which vapours are drawn off by the vapour extraction pipe or duct 30. The organic matter 10 is heated by the heat transfer sleeve 26 which is surrounded by the insulation sleeve 12.

While FIG. 2 implies that the heating zone and/or chamber 20 is of a box-like or rectangular shape, it is of note that the heating zone and/or chambers may be of any suitable shape. As is known by those of skill in the art, high temperatures can cause structures like this to expand and deform at differing rates, causing structural failure. Accordingly, in some embodiments of the invention, at least some of the heating zone and/or chambers, for example, the pyrolysis heating zone and/or chamber and the torrefaction heating zone and/or chamber may be cylindrical in shape.

As will be appreciated by one of skill in the art, the funnel 22 is configured to direct material that falls out of the airlock above it into the heating zone and/or chamber but also to create a "vapour space" around the funnel where material is unable to accumulate and from where vapours can be drawn, as shown in FIG. 2. This arrangement prevents solid material from blocking the vapour extraction pipe or duct.

The heat transfer sleeve 26 is configured to achieve and maintain the target temperature of a particular zone and/or chamber. In some embodiments of the invention the heat transfer sleeve may be filled with a suitable heat transfer fluid, itself heated directly by electrical elements or pumped through the sleeve after being heated through the combustion of vapours drawn from the system's heating zone and/or chambers. In other embodiments of the invention, the heat transfer sleeve may more simply be heated with flue gases from the combustion of vapours drawn from the system's heating zone and/or chambers.

In some embodiments of the invention, each heating zone and/or chamber is adjacent to or attached to an upper airlock and a lower airlock. As will be appreciated by one of skill in the art and as discussed herein, the use of airlocks allows for organic waste to be passed from one heating zone and/or chamber to the next heating zone and/or chamber in series or to allow biocarbon to exit the last heating zone and/or chamber while preventing ingress of air or oxygen into the carbonization system and/or minimizing the co-mixing of early-stage or conditioning vapours, mid-stage or torrefaction vapours or later-stage or pyrolysis vapours, as discussed below.

In some embodiments of the invention, each heating zone and/or chamber has associated therewith a heating system or systems for heating the organic waste within the respective heating zone and/or chamber, as discussed herein.

In some embodiments, each heating zone and/or chamber has at least one temperature sensor which measures temperature within said zone and/or chamber and to which the respective heating system or systems is directly or indirectly responsive. In this manner, temperatures of the organic waste undergoing carbonization can be controlled for example within a few degrees of the desired temperature, thereby allowing for greater control over the outcome of carbonization, as discussed herein.

In some embodiments of the invention, each heating zone and/or chamber has at least one sensor for detecting vapours released from the organic waste. For example, there may be one or more sensor within the carbonization system, wherein each sensor is arranged to or is capable of or is configured to detect the pressure, volume and/or chemical composition of the respective vapours of interest.

In some embodiments of the invention, organic waste may be retained within a specific zone and/or chamber until the respective sensor reports that production of the respective vapours of interest from the respective organic waste has achieved or decreased to a desired level. For example, the respective sensor may detect carbon dioxide and the desired level of carbon dioxide production may be a level of production that is within the acceptable limits for recovery of vapours from the next heating zone and/or chamber.

In some embodiments of the invention, some of the vapours drawn from the vapour extraction pipe or duct 30 are drawn into a circulation heater 34 by opening control valve 32 so that the vapours are heated and injected into the heating zone and/or chamber 20 through the perforated pipe 36. This will bring heat into and through the organic material via convection, which may be more effective and efficient at heating the organic matter material as compared to just conduction alone.

That is, in embodiment of the invention, material within a zone is heated to the target temperature through the use of a circulation heater. Vapours from inside the top of the zone and/or chamber are drawn out and moved through a circulation heater and then introduced into the bottom of the same zone and/or chamber, thereby allowing heat to be transferred from the circulation heater to the vapours and then into the material inside a zone through convection. The temperature and volume of the vapours leaving the circulation heater is controlled by a programmable logic controller. As pressure builds within a zone and/or chamber, excess gases may be drawn off for example by closing control valve 32 and opening control valve 38 and used to generate mechanical, heat and/or electrical energy for use in other aspects of the carbonization system.

In some embodiments, the vapour is injected with a stainless-steel pipe being positioned at a downward angle into the cylinder such that the pipe terminates near the bottom center of the cylinder. This pipe could be open ended, could include a number of perforations, or be fitted with a perforated ring, vertical section, manifold, array or components of similar design and/or function such that the heated gases can exit the pipe at different points and then percolate up via multiple "channels" through the material.

In some embodiments of the invention, each heating zone and/or chamber comprises an agitator for promoting movement of the organic waste through the carbonization system. Specifically, the agitator may promote passage of the organic waste from the top of the respective heating zone and/or chamber to the bottom of the same heating zone and/or chamber but also promote exit of this material at the bottom of this respective heating zone and/or chamber through the airlock of the respective heating zone and/or chamber and either into the next heating zone and/or chamber or out of the carbonization system, as discussed herein.

In some embodiments of the invention, the agitator is present in the airlock, as shown in FIG. 2. Specifically, as shown therein, the airlock assembly 10 comprises an agitator 14 within the airlock that is surrounded by the insulation sleeve 12.

The purpose of the airlock "agitator" is to disturb the material situated at the bottom of the heating zone and/or chamber so that it can be moved more easily through the airlock itself. Without such agitation the subsequent airlock mechanisms 15 may be unable to effectively or efficiently move the material through the airlock.

Accordingly, the purpose of the airlock assembly of the invention is to facilitate the passage of solid organic waste pieces from one zone and/or chamber of the system to another zone and/or chamber of the system while simultaneously limiting the passage of vapours (including external air/oxygen) between the zones and/or chambers.

In some embodiments of the invention, the airlock assemblies are separate components that can be removed (for replacement or maintenance) and are not necessarily an integrated part of the heating zone and/or chambers.

As will be apparent to those of skill in the art, the airlock is fitted with moving and wearable parts and require regular maintenance or servicing. If the airlocks were integrated into the heating zones and/or cylinders then it would be much more difficult to service.

According to another aspect of the invention, there is provided a continuous method for producing biocarbon from organic waste comprising:

adding a quantity of organic waste having a moisture content of less than about 50%, said organic waste comprising organic waste pieces, at least about 50% of said organic waste pieces having a diameter of less than about 150 millimeters to a first zone and/or chamber of a carbonization system at a top of the carbonization system;

conditioning the organic waste by heating the organic waste to between about 100° C. and about 200° C. in the first zone and/or chamber of the carbonization system, said heating of the organic waste to between about 100° C. and about 200° C. softening the organic waste and releasing conditioning vapours therefrom, thereby producing conditioned organic waste;

removing said conditioning vapours from the first zone and/or chamber of the carbonization system;

said conditioned organic waste passing in a continuous or periodic basis through an airlock assembly from the first zone and/or chamber of the carbonization system to a second zone and/or chamber of the carbonization system;

heating the conditioned organic waste to between about 200° C. and about 320° C. in the second zone and/or chamber of the carbonization system, said heating of the conditioned organic waste to between about 200° C. and about 320° C. releasing torrefaction vapours therefrom, thereby producing torrefied organic waste;

removing said torrefaction vapours from the second zone and/or chamber of the carbonization system;

said torrefied organic waste passing in a continuous or periodic basis through an airlock assembly from the second zone and/or chamber of the carbonization system to a third zone and/or chamber of the carbonization system;

heating the torrefied organic waste to between about 320° C. and about 800° C. in the third zone and/or chamber of the carbonization system, said heating the torrefied organic waste to between about 320° C. and about 800° C. releasing pyrolysis vapours therefrom, thereby producing biocarbon;

removing said pyrolysis vapours from the third zone and/or chamber of the carbonization system; and recovering in a continuous or periodic basis through an airlock assembly the biocarbon from the carbonization system.

In some embodiments of the invention, as biocarbon is recovered from the bottom of the carbonization system, a corresponding amount of organic waste having a moisture content of less than about 50%, said organic waste comprising organic waste pieces, at least about 50% of said organic waste pieces having a diameter of less than about 150 millimeters is added to the top of the carbonization system. That is, in these embodiments, an equivalent amount of prepared organic waste is added to the top of the carbonization system as is being recovered as biocarbon from the bottom of the carbonization system. As will be apparent to one of skill in the art, "an equivalent amount" is the amount of prepared organic waste necessary to produce the amount of biocarbon being removed from the carbonization system.

As will be appreciated by one of skill in the art, in the embodiment described above, the process is a continuous process in that while the carbonization system is operational, prepared organic waste can be added continuously or on a periodic basis and as such is different from systems in which material is carbonized in full or complete batches.

As discussed herein, the vapours being drawn off and/or recovered can be used either within the process itself or used for other purposes. For example, the vapours may be drawn off and condensed into useful liquids or used to power an electrical generator, which could then be used to heat electrical elements and move electrical motors, as discussed herein.

While the preferred embodiments of the invention have been described above, it will be recognized and understood that various modifications may be made therein, and the appended claims are intended to cover all such modifications which may fall within the spirit and scope of the invention.

The invention claimed is:

1. A method for producing biochar from organic waste comprising:

providing a quantity of organic waste having a moisture content of less than about 50%, said organic waste comprising organic waste pieces, at least about 50% of said organic waste pieces having a diameter of less than about 150 millimeters;

the organic waste pieces passing through an airlock into a conditioning chamber of a carbonization system;

conditioning the organic waste by heating the organic waste to between about 100° C. and about 200° C. in the conditioning chamber, said heating of the organic waste to between about 100° C. and about 200° C. softening the organic waste and releasing conditioning vapours from the organic waste, thereby producing conditioned organic waste, said conditioning vapours comprising water vapour, said conditioning chamber comprising a first funnel at a top portion of the conditioning chamber, said first funnel configured to direct the organic waste into the conditioning chamber and to create a conditioning chamber vapour collection space around the first funnel where organic waste is unable to accumulate; a conditioning vapour extraction pipe or duct positioned in the conditioning chamber vapour collection space for removing conditioning vapours from the conditioning chamber;

removing said conditioning vapours produced from the organic waste within the conditioning chamber of the carbonization system;

the conditioned organic waste passing through an airlock into a torrefaction chamber of the carbonization system;

heating the conditioned organic waste to between about 200° C. and about 320° C. in the torrefaction chamber of the carbonization system, said heating of the conditioned organic waste to between about 200° C. and about 320° C. releasing torrefaction vapours from the conditioned organic waste, thereby producing torrefied organic waste, the torrefaction vapours comprising carbon dioxide, carbon monoxide and hydrocarbons, said torrefaction chamber comprising: a second funnel at a top portion of the torrefaction chamber, said second funnel configured to direct the organic waste from the conditioning chamber into the torrefaction chamber and to create a torrefaction chamber vapour collection space around the second funnel where organic waste is unable to accumulate; a torrefaction vapour extraction pipe or duct positioned in the torrefaction vapour collection space for removing torrefaction vapours from the torrefaction chamber;

removing said torrefaction vapours released from the conditioned organic matter in the torrefaction chamber of the carbonization system;

the torrefied organic waste passing through an airlock into a pyrolysis chamber of the carbonization system, said pyrolysis chamber comprising: a third funnel at a top portion of the pyrolysis chamber, said third funnel configured to direct the organic waste from the torrefaction chamber into the pyrolysis chamber and to create a pyrolysis chamber vapour collection space around the third funnel where organic waste is unable to accumulate; a pyrolysis vapour extraction pipe or duct positioned in the pyrolysis chamber vapour collection space for removing pyrolysis vapours from the pyrolysis chamber;

heating the torrefied organic waste to between about 320° C. and about 800° C. in a pyrolysis chamber of the carbonization system, said heating of the torrefied organic waste releasing pyrolysis vapours from the torrefied organic waste, thereby producing biochar, the pyrolysis vapours comprising hydrogen and hydrocarbons;

removing said pyrolysis vapours from the torrefied organic matter, thereby producing biochar; and passing the biochar from the pyrolysis chamber through an airlock, thereby recovering the biochar from the carbonization system;

the airlock affixed to the bottom portion of the conditioning chamber and to the top of the torrefaction chamber configured to pass organic waste from the conditioning chamber to the torrefaction chamber;

the airlock affixed to the bottom portion of the torrefaction chamber and to the top portion of the pyrolysis chamber configured to pass organic waste from the torrefaction chamber to the pyrolysis chamber; and the airlock affixed to the bottom portion of the pyrolysis chamber configured to pass biochar to a collection hopper wherein the conditioning chamber, the torrefaction chamber and the pyrolysis chamber are arranged in a substantially vertical stack to allow gravity to assist in moving the organic waste pieces from higher to lower chambers.

2. The method according to claim 1 wherein each airlock comprises an agitator for promoting movement of the organic waste through the carbonization system while limiting the passage of vapours, air or oxygen.

3. The method according to claim 1 wherein the diameter is 5 to 50 mm.

4. The method according to claim 1 wherein the moisture content is 0 to about 20%.

5. The method according to claim 1 wherein the organic waste is conditioned by heating the organic waste to about 200° C. as the organic waste passes from a top of the conditioning chamber to a bottom of the conditioning chamber.

6. The method according to claim 1 wherein the conditioned organic waste is heated from about 200° C. to about 320° C. as the conditioned organic waste passes from a top of the torrefaction chamber to a bottom of the torrefaction chamber.

7. The method according to claim 1 wherein the torrefied organic waste is heated from about 320° C. to about 600° C.

8. The method according to claim 1 wherein the torrefied organic waste is heated from about 320° C. to about 600° C. as torrefied organic waste passes from a top of the pyrolysis chamber to a bottom of the pyrolysis chamber.

9. The method according to claim 1 including reinjecting removed vapours into the organic waste.

10. A continuous method for producing biochar from organic waste comprising:

adding a quantity of organic waste having a moisture content of less than about 20%, said organic waste comprising organic waste pieces, at least about 50% of said organic waste pieces having a diameter of less than about 50 millimeters to a conditioning chamber of a carbonization system at a top of the carbonization system;

conditioning the organic waste by heating the organic waste to between about 100° C. and about 200° C. in the conditioning chamber of the carbonization system, said heating of the organic waste to between about 100° C. and about 200° C. softening the organic waste and releasing conditioning vapours from the organic waste, thereby producing conditioned organic waste, the conditioning vapours comprising water vapour, said conditioning chamber comprising a first funnel at a top portion of the conditioning chamber, said first funnel configured to direct the organic waste into the conditioning chamber and to create a conditioning chamber vapour collection space around the first funnel where organic waste is unable to accumulate; and a conditioning vapour extraction pipe or duct positioned in the conditioning chamber vapour collection space for removing conditioning vapours from the conditioning chamber;

removing said conditioning vapours released within the conditioning chamber of the carbonization system;

said conditioned organic waste passing through an airlock on a continuous or periodic basis from the conditioning chamber of the carbonization system to a torrefaction chamber of the carbonization system;

heating the conditioned organic waste to between about 200° C. and about 320° C. in the torrefaction chamber of the carbonization system, said heating of the conditioned organic waste to between about 200° C. and about 320° C. releasing torrefaction vapours from the conditioned organic waste, thereby producing torrefied organic waste, the torrefaction vapours comprising carbon dioxide, carbon monoxide and hydrocarbons, said torrefaction chamber comprising: a second funnel at a top portion of the torrefaction chamber, said second funnel configured to direct the organic waste from the conditioning chamber into the torrefaction chamber and to create a torrefaction chamber vapour collection space around the second funnel where organic waste is unable to accumulate; a torrefaction vapour extraction pipe or duct positioned in the torrefaction vapour collection space for removing torrefaction vapours from the torrefaction chamber;

removing said torrefaction vapours released within the torrefaction chamber of the carbonization system;

said torrefied organic waste passing through an airlock on a continuous or periodic basis from the torrefaction chamber of the carbonization system to a pyrolysis chamber of the carbonization system;

heating the torrefied organic waste to between about 320° C. and about 800° C. in the pyrolysis chamber of the carbonization system, said heating of the torrefied organic waste to between about 320° C. and about 800° C. releasing pyrolysis vapours from the torrefied organic waste, thereby producing biochar, the pyrolysis vapours comprising hydrogen and hydrocarbons, said pyrolysis chamber comprising: a third funnel at a top portion of the pyrolysis chamber, said third funnel configured to direct the organic waste from the torrefaction chamber into the pyrolysis chamber and to create a pyrolysis chamber vapour collection space around the third funnel where organic waste is unable to accumulate; a pyrolysis vapour extraction pipe or duct positioned in the pyrolysis chamber vapour collection space for removing pyrolysis vapours from the pyrolysis chamber;

removing said pyrolysis vapours released within the pyrolysis chamber of the carbonization system; and said biochar passing through an airlock on a continuous or periodic basis from the pyrolysis chamber of the carbonization system to a collection hopper at the bottom of the carbonization system;

the airlock affixed to the bottom portion of the conditioning chamber and to the top of the torrefaction chamber configured to pass organic waste from the conditioning chamber to the torrefaction chamber;

the airlock affixed to the bottom portion of the torrefaction chamber and to the top portion of the pyrolysis chamber configured to pass organic waste from the torrefaction chamber to the pyrolysis chamber; and the airlock affixed to the bottom portion of the pyrolysis chamber configured to pass biochar to a collection hopper wherein the conditioning chamber, the torrefaction chamber and the pyrolysis chamber are arranged in a substantially vertical stack to assist in moving the organic waste from higher to lower chambers.

11. The method according to claim 10 wherein each airlock comprises an agitator for promoting movement of the organic waste through the carbonization system.

12. The method according to claim 10 wherein the diameter of the organic waste pieces is 5 to 50 mm.

13. The method according to claim 10 wherein the moisture content of the organic waste pieces is 0 to about 20%.

14. The method according to claim 10 wherein the organic waste is conditioned by heating the organic waste to about 200° C. as the organic waste passes from a top of the conditioning chamber to a bottom of the conditioning chamber.

15. The method according to claim 10 wherein the conditioned organic waste is heated from about 200° C. to about 320° C. as the conditioned organic waste passes from a top of the torrefaction chamber to a bottom of the torrefaction chamber.

16. The method according to claim 10 wherein the torrefied organic waste is heated from about 320° C. to about 600° C. as torrefied organic waste passes from a top of the pyrolysis chamber to a bottom of the pyrolysis chamber.

17. The method according to claim 10 including injecting removed vapours into the organic waste.

18. A carbonization apparatus comprising:
a conditioning chamber for receiving organic waste pieces, said conditioning chamber comprising
a first funnel at a top portion of the conditioning chamber, said first funnel configured to direct the organic waste into the conditioning chamber and to create a conditioning chamber vapour collection space around the first funnel where organic waste is unable to accumulate;
a conditioning vapour extraction pipe or duct positioned in the conditioning chamber vapour collection space for removing conditioning vapours from the conditioning chamber;
a first heat sleeve on an outer surface of the conditioning chamber, said first heat sleeve configured to heat the organic waste in the conditioning chamber to a temperature between about 100° C. and about 200° C.;

a torrefaction chamber for receiving organic waste from the conditioning chamber, said torrefaction chamber comprising:
a second funnel at a top portion of the torrefaction chamber, said second funnel configured to direct the organic waste from the conditioning chamber into the torrefaction chamber and to create a torrefaction chamber vapour collection space around the second funnel where organic waste is unable to accumulate:
a torrefaction vapour extraction pipe or duct positioned in the torrefaction vapour collection space for removing torrefaction vapours from the torrefaction chamber;
a second heat sleeve on an outer surface of the torrefaction chamber, said second heat sleeve configured to heat the organic waste in the torrefaction chamber to a temperature between about 200° C. and about 320° C.; and a pyrolysis chamber for receiving organic waste from the torrefaction chamber, said pyrolysis chamber comprising:
a third funnel at a top portion of the pyrolysis chamber, said third funnel configured to direct the organic waste from the torrefaction chamber into the pyrolysis chamber and to create a pyrolysis chamber vapour collection space around the third funnel where organic waste is unable to accumulate;
a pyrolysis vapour extraction pipe or duct positioned in the pyrolysis chamber vapour collection space for removing pyrolysis vapours from the pyrolysis chamber;
a third heat sleeve on an outer surface of the pyrolysis chamber, said third heat sleeve configured to heat the organic waste in the pyrolysis chamber to a temperature between about 320° C. and about 800° C., an airlock affixed to the bottom portion of the conditioning chamber and to the top of the torrefaction chamber configured to pass organic waste from the conditioning chamber to the torrefaction chamber:

an airlock affixed to the bottom portion of the torrefaction chamber and to the top portion of the pyrolysis chamber configured to pass organic waste from the torrefaction chamber to the pyrolysis chamber; and an airlock affixed to the bottom portion of the pyrolysis chamber configured to pass biochar to a collection hopper wherein each airlock comprises an agitator for promoting movement of the organic waste through the carbonization apparatus while limiting passage of vapours, air or oxygen, and wherein at least the conditioning chamber, torrefaction chamber and pyrolysis chamber are arranged in a substantially vertical stack to allow gravity to assist in moving the organic waste pieces from higher to lower chambers.

19. The apparatus according to claim 18, wherein each chamber has at least one vapour sensor for detecting pressure, volume and/or type of specific vapours released from the organic waste within the respective chamber.

20. The apparatus according to claim 18, wherein each respective chamber further comprises a circulation heater connected at a first end to a corresponding vapour extraction pipe or duct for receiving drawn off vapour from the corresponding vapour extraction pipe or duct, said circulation heater connected at a second end thereof to an injector, said injector positioned at a bottom of the respective chamber, said injector configured to inject heated vapour into the organic waste in the respective chamber.

* * * * *